Patented Jan. 31, 1928.

1,657,870

UNITED STATES PATENT OFFICE.

JAMES H. SHERTS, OF NEWARK, NEW JERSEY, ASSIGNOR TO E. I. DU PONT DE NEMOURS & COMPANY, OF WILMINGTON, DELAWARE, A CORPORATION OF DELAWARE.

METHOD OF REJUVENATING CELLULOSE ESTER PLASTIC.

No Drawing. Application filed November 1, 1923, Serial No. 672,070. Renewed August 1, 1927.

This invention is in the art of cellulose ester plastics and relates particularly to a method of restoring brittle and deteriorated plastic to its original somewhat flexible, and workable, state, whereby the plastic, instead of having to be scrapped at a total loss or sold at reduced prices, can be handled, worked and sold the same as new stock.

Cellulose ester plastic, particularly nitrocellulose, or pyroxylin plastic, such for example as pyralin, i. e. plastic containing (by weight) pyroxylin and camphor, or camphor substitutes, in about the ratio 3:1 and solvents such as denatured alcohol, fusel oil and so forth ranging substantially between 1 to 4% (such plastics are well known and no claim therefor, as such, is made herein) should, and as freshly manufactured does, contain a certain amount of residual solvent, as indicated. The presence of such solvent is an important factor in the flexibility and working properties of the stock, as the absence or undue reduction of the same renders the stock brittle. Upon long storage or exposure of the stock this reduction of solvent occurs, the stock drying out due to excessive evaporation of solvent. In consequence, the stock can be used only for the manufacture of certain cheap articles, or must be scrapped. Stock of this character is a considerable problem to the plastic manufacturer, it coming about through cancellation of orders, or where stock is manufacturered without order, in which cases it must be held in storage for an unusually long time.

I have devised a method whereby such stock can be readily rejuvenated or restored to its desired condition of softness and flexibility. Furthermore the cost of such method is low, ranging from three to eight cents per pound of plastic treated. After treatment, the stock, having had its original qualities restored, can be sold at standard prices. It is the object of the invention to provide a method having the desirable features indicated. To this end, and also to improve generally upon methods of the character indicated, the invention consists in the various matters hereinafter described and claimed.

I have found that the plastic can be restored by submerging it in a bath of, or exposing it to the vapors of, a suitable solvent, the time of submersion or exposure depending on the strength of the bath or vapor, thickness of the plastic, degree of brittleness, and degree of softness required. The method is based on this.

In accordance with the invention, the plastic is subjected to the action of a rejuvenating fluid containing high boiling solvent, that is solvent which boils at substantially 100° C. or above. The solvent not only penetrates the plastic but remains in it, and this restores the plasticity. A fluid having insufficient high boiling solvent, e. g. a fluid having only low-boiling solvents, gives a temporary rejuvenation and is not, generally speaking, satisfactory from a practical standpoint on account of the plastic becoming as brittle as ever within a few days. Desirably the treating fluid may contain a diluent, as low boiling solvent or solvents, or inert substances such as benzol, water, and so forth. A diluent enables better control of the procedure, to the end of obtaining better penetration without excessive colloiding of the surface as might be the case if 100% strong high boiling solvents were used. Suitable high-boiling solvents are, say, fusel oil, amyl acetate, butyl acetate, diacetone alcohol, acetic acid, and high boiling acetone oils. Suitable low-boiling solvents, that is solvents boiling below substantially 100° C., are, for example, wood alcohol, denatured alcohol, acetone, methyl acetone, ether-alcohol, ethyl acetate, and ethyl methyl ketone. An excess of high boiling solvent may be used but it has a tendency to make the plastic too soft; extra seasoning is then required and in addition the cost of rejuvenation is increased due to the high cost of high boiling solvents.

The exact formula of the rejuvenating fluid will of course depend upon the condition of the plastic to be treated, the cost of solvents, the desired degree of softness, and so on. Generally speaking, a treating fluid containing high boiling solvent 5 to 100% and diluent (e. g. low boiling solvent) 95 to 0% may be used. Similarly, the time of subjection of the plastic to the treatment will vary. Therefore, in practice these factors of formula and time will be varied at will to meet particular conditions.

By way of example merely, I note as suitable formulas for submersion solution meeting general conditions the following (parts by volume):—

|  |  | Preferred |
|---|---|---|
| (1) Denatured alcohol | 20-60% | 40% |
| Ethyl acetate | 10-30 | 20 |
| Amyl acetate | 60-70 | 40 |
| (2) Ethyl acetate | 50-90 | 70 |
| Butyl acetate | 10-50 | 30 |
| (3) Diacetone alcohol | 10-30 | 20 |
| Denatured alcohol | 50-70 | 60 |
| Ethyl acetate | 10-30 | 20 |

The approximate submersion time advisable when using a bath having a composition such as the preferred above indicated I have found to be for nitrocellulose plastic—

Less than .020 inch thick _____ 3 seconds.
Between .020 and .040 inch ____ 5 seconds.
Between .040 and .050 inch ____ 15 seconds.
Between .050 and .100 inch ____ 30 seconds.
Between .100 and .200 inch ____ 1 minute.
Over .200 inch _____ 2-5 minutes.

The time required to rejuvenate plastic by subjection to vapors depends upon the density of the vapors: it ranges from five minutes to about one week.

In treating by submersion it is merely necessary to completely submerge the plastic, be it in the form of sheets, rods, tubes, or whatnot, in a bath contained in a suitable tray or vat. In treating by vapor, a suitable closed chamber with provisions for introduction of the vapors and circulation of the same about and in contact with the plastic may be used. The above formulas may be used, but on account of the low boiling solvents evaporating off first it is preferable to use simply the high boiling solvents and control the process by controlling the density of the vapors. This may be done by raising or lowering the temperature as will be understood.

After treatment of the plastic it is hung up to dry in suitable chambers, taking care to prevent it touching other objects as it is very soft and will become marred. After thus drying at room temperature, say 70° F., until it is no longer sticky, approximately 15 minutes, the plastic is placed in a warm room at approximately 100° F. for approximately 48 hours. It is then substantially in the same condition as at the end of its regular seasoning, in the usual process of manufacture, after being newly manufactured, and can be pressed, polished, and worked in the same manner as new goods.

For example, and as a specific illustration of the working and effect of the method, I give the following:—Thickness of goods, .090 inch; original residual solvent content, between 2 and 3%; deteriorated solvent content, fraction of 1%; treating solution; formula "1" in preferred amounts; time of treatment 1 minute; drying, as specified above; residual solvent, 3%.

As indicated, while specific reference has been made to the rejuvenation of plastics of cellulose nitrate, I do not confine the invention thereto, since plastics of other cellulose esters, e. g. cellulose acetate, may also be treated, the procedure, solvents and so on, as above, being adaptable thereto.

I claim:

1. The method of rejuvenating cellulose ester plastic, become deficient in residual solvent, which comprises treating the plastic with a solvent of a character to substantially permanently remain in the plastic, and for a time sufficient to bring about substantial penetration of the body of the plastic, thereby to replenish the residual solvent.

2. The method of rejuvenating cellulose ester plastic, become deficient in residual solvent, which comprises treating the plastic with a high boiling solvent therefor, for a sufficient time to bring about substantial penetration of the body of the plastic, thereby to replenish the residual solvent.

3. The method of rejuvenating cellulose ester plastic, become deficient in residual solvent, which comprises treating the plastic with a liquid comprising high boiling solvent for the plastic and a diluent for a sufficient time to bring about substantial penetration of the body of the plastic, thereby to replenish the residual solvent.

4. The method of rejuvenating cellulose ester plastic, become deficient in residual solvent, which comprises treating the plastic with a liquid comprising high boiling solvent for the plastic and a low boiling solvent for a sufficient time to bring about substantial penetration of the body of the plastic, thereby to replenish the residual solvent.

5. The method of rejuvenating cellulose ester plastic, become deficient in residual solvent, which comprises treating the plastic with a liquid comprising substantially 5 to 100% of high boiling solvent for the plastic and substantially 95 to 0% of diluent, for a sufficient time to bring about substantial penetration of the body of the plastic, thereby to replenish the residual solvent.

6. The method of rejuvenating cellulose ester plastic, become deficient in residual solvent, which comprises treating the plastic with a liquid comprising substantially 5 to 100% of high boiling solvent for the plastic and substantially 95 to 0% of low boiling solvent, for a sufficient time to bring about substantial penetration of the body of the plastic, thereby to replenish the residual solvent.

7. The method of rejuvenating cellulose ester plastic, become deficient in residual solvent, which comprises treating the plastic with a liquid comprising substantially 10 to 70% of high boiling solvent for the plastic and substantially 90 to 30% of low boiling solvent, for a sufficient time to bring about substantial penetration of the body of the plastic, thereby to replenish the residual solvent.

8. The method of rejuvenating cellulose ester plastic, become deficient in residual solvent, which comprises treating the plastic with a liquid comprising substantially between 20 to 60% of denatured alcohol, substantially between 10 to 30% of ethyl acetate, and substantially between 60 to 70% of amyl acetate, for a sufficient time to bring about substantial penetration of the body of the plastic, thereby to replenish the residual solvent.

9. The method of rejuvenating cellulose ester plastic, become deficient in residual solvent, which comprises treating the plastic with a solvent of a character to remain substantially permanently in the plastic until the amount of solvent necessary to restore the solvent content to the desired residual amount has penetrated the plastic, and drying.

10. The method of rejuvenating cellulose ester plastic, become deficient in residual solvent, which comprises treating the plastic with a solvent of a character to remain substantially permanently in the plastic until the amount of solvent necessary to restore the solvent content to the desired residual amount has penetrated the plastic, drying the plastic at substantially 70° F. until stickiness is removed, and drying at substantially 100° F. for substantially 48 hours.

11. The method of rejuvenating a brittle plastic mass containing a gelatinizable derivative of cellulose, which comprises introducing into the mass a substance capable of acting as a substantially permanent softener and flexibilizer.

12. The method of rejuvenating a brittle plastic mass containing a gelatinizable derivative of cellulose, which comprises introducing into the mass a high boiling solvent capable of acting as a substantially permanent softener and flexibilizer.

13. The method of claim 11 in which the rejuvenating substance is introduced into the mass by treating the latter with the substance as either liquid or vapor.

14. The method of claim 12 in which the solvent is introduced into the mass by treating the latter with the solvent as either liquid or vapor.

In testimony whereof I affix my signature.

JAMES H. SHERTS.